G. A. ENSIGN.
WHEEL RIM EQUALIZING AND TRUING MACHINE.
APPLICATION FILED APR. 2, 1912.

1,038,544.

Patented Sept. 17, 1912.

4 SHEETS—SHEET 1.

WITNESSES
Edward Thorpe

INVENTOR
George A. Ensign
BY
ATTORNEYS

G. A. ENSIGN.
WHEEL RIM EQUALIZING AND TRUING MACHINE.
APPLICATION FILED APR. 2, 1912.

1,038,544.

Patented Sept. 17, 1912.
4 SHEETS—SHEET 2.

WITNESSES
Edward Thorpe

INVENTOR
George A. Ensign
BY
ATTORNEYS

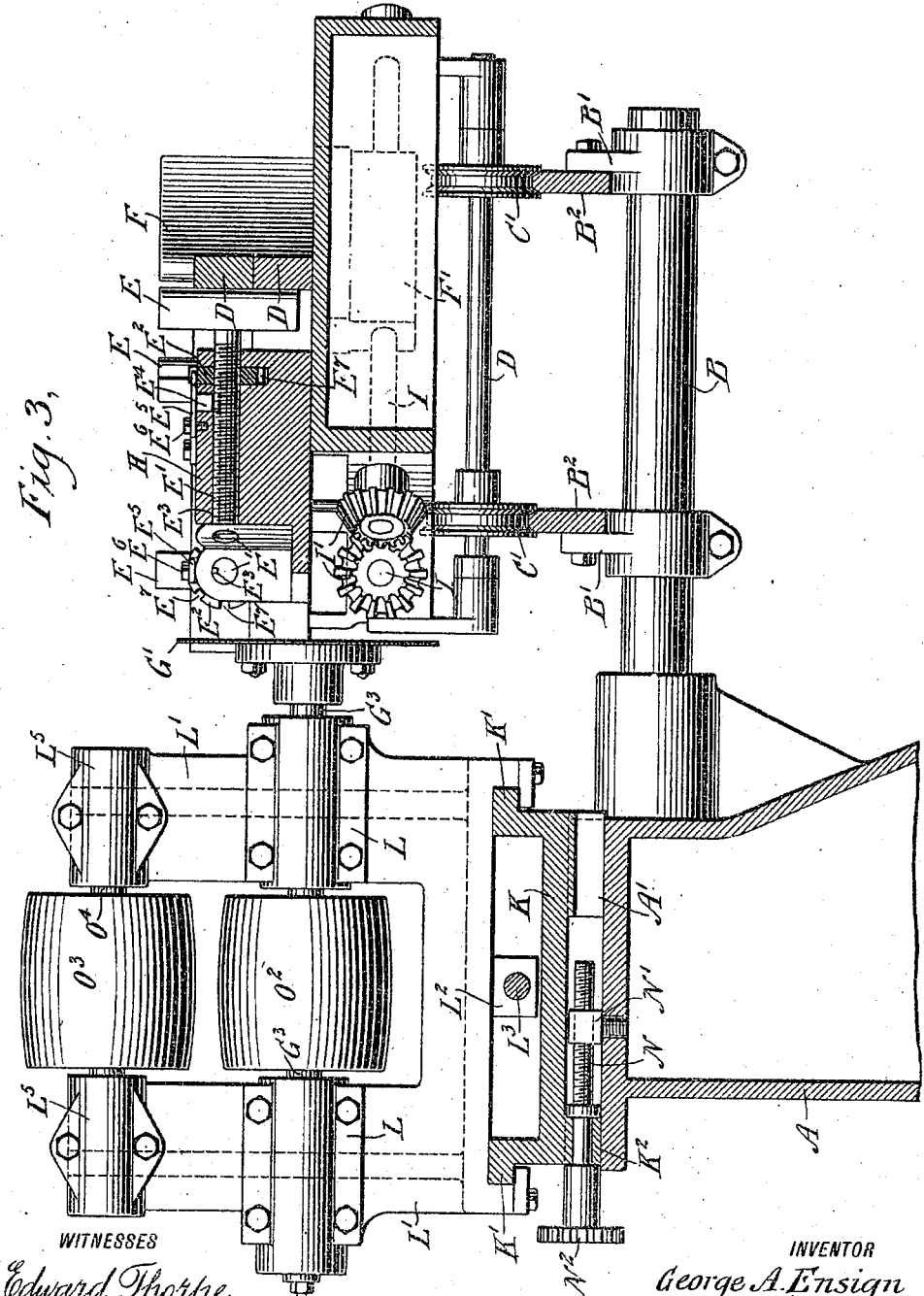

G. A. ENSIGN.
WHEEL RIM EQUALIZING AND TRUING MACHINE.
APPLICATION FILED APR. 2, 1912.
1,038,544.
Patented Sept. 17, 1912.
4 SHEETS—SHEET 4.
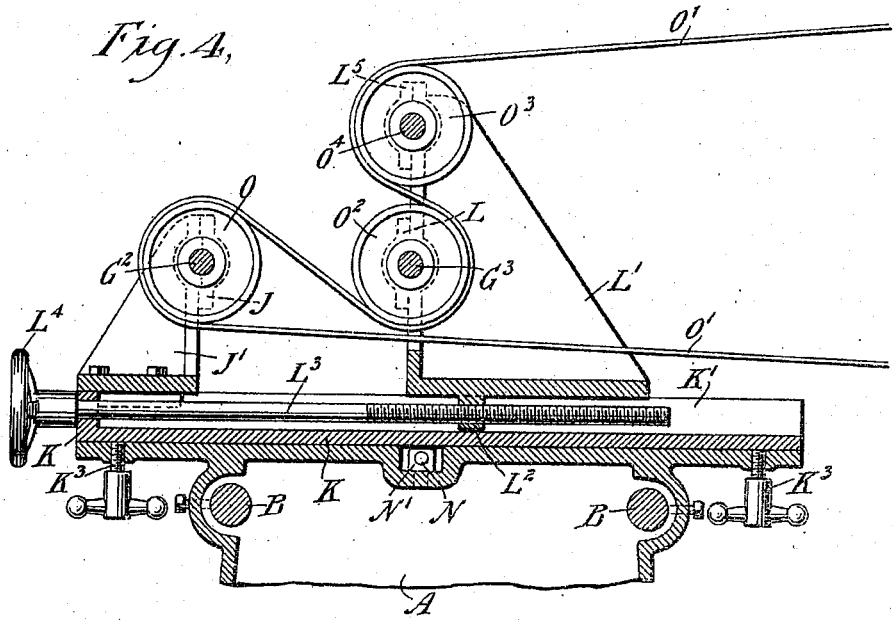
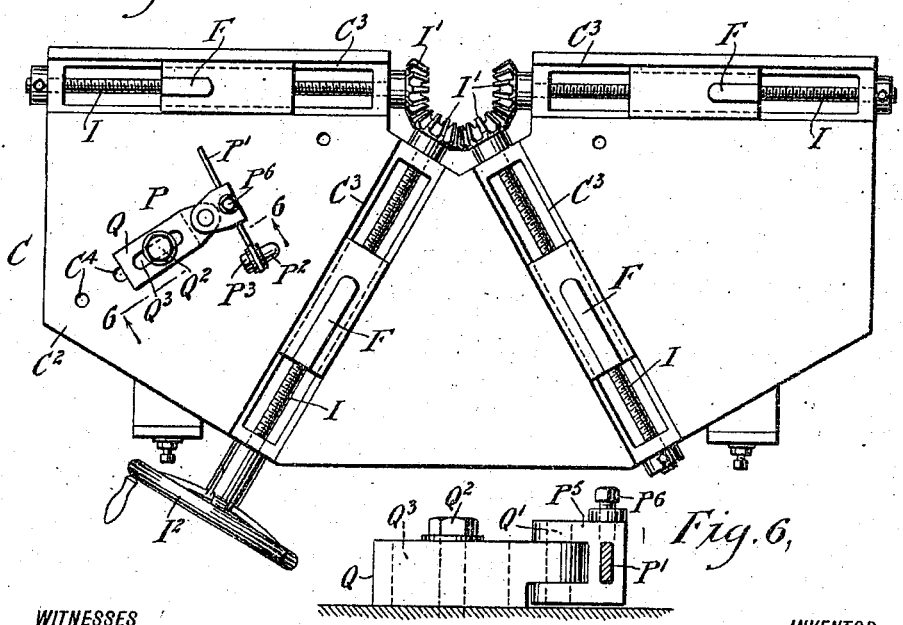
WITNESSES
Edward Thorpe
INVENTOR
George A. Ensign
BY
ATTORNEYS

UNITED STATES PATENT OFFICE.

GEORGE A. ENSIGN, OF DEFIANCE, OHIO, ASSIGNOR TO DEFIANCE MACHINE WORKS, OF DEFIANCE, OHIO.

WHEEL-RIM EQUALIZING AND TRUING MACHINE.

1,038,544.  Specification of Letters Patent.  Patented Sept. 17, 1912.

Application filed April 2, 1912. Serial No. 687,979.

*To all whom it may concern:*

Be it known that I, GEORGE A. ENSIGN, a citizen of the United States, and a resident of Defiance, in the county of Defiance and State of Ohio, have invented a new and Improved Wheel-Rim Equalizing and Truing Machine, of which the following is a full, clear, and exact description.

The invention relates to woodworking machines, and its object is to provide a new and improved wheel rim equalizing and truing machine, more especially designed for reducing half rims or fellies to circular shape and accurately cutting off the ends of the half rims or fellies to produce half rims or fellies of true semicircular shape, thus eliminating subsequent sawing of the joint when placing the rims on the spokes.

For the purpose mentioned use is made of a pair of circular saws and truing or gaging means for bending the half rim so that the latter assumes circular shape, the said truing means and the said saws having movement one relative to the other so that the saws cut off the ends of the half rim while the latter is held in trued position by the said truing or gaging means to produce a half rim of true semicircular shape.

A practical embodiment of the invention is represented in the accompanying drawings forming a part of this specification, in which similar characters of reference indicate corresponding parts in all the views.

Figure 1:
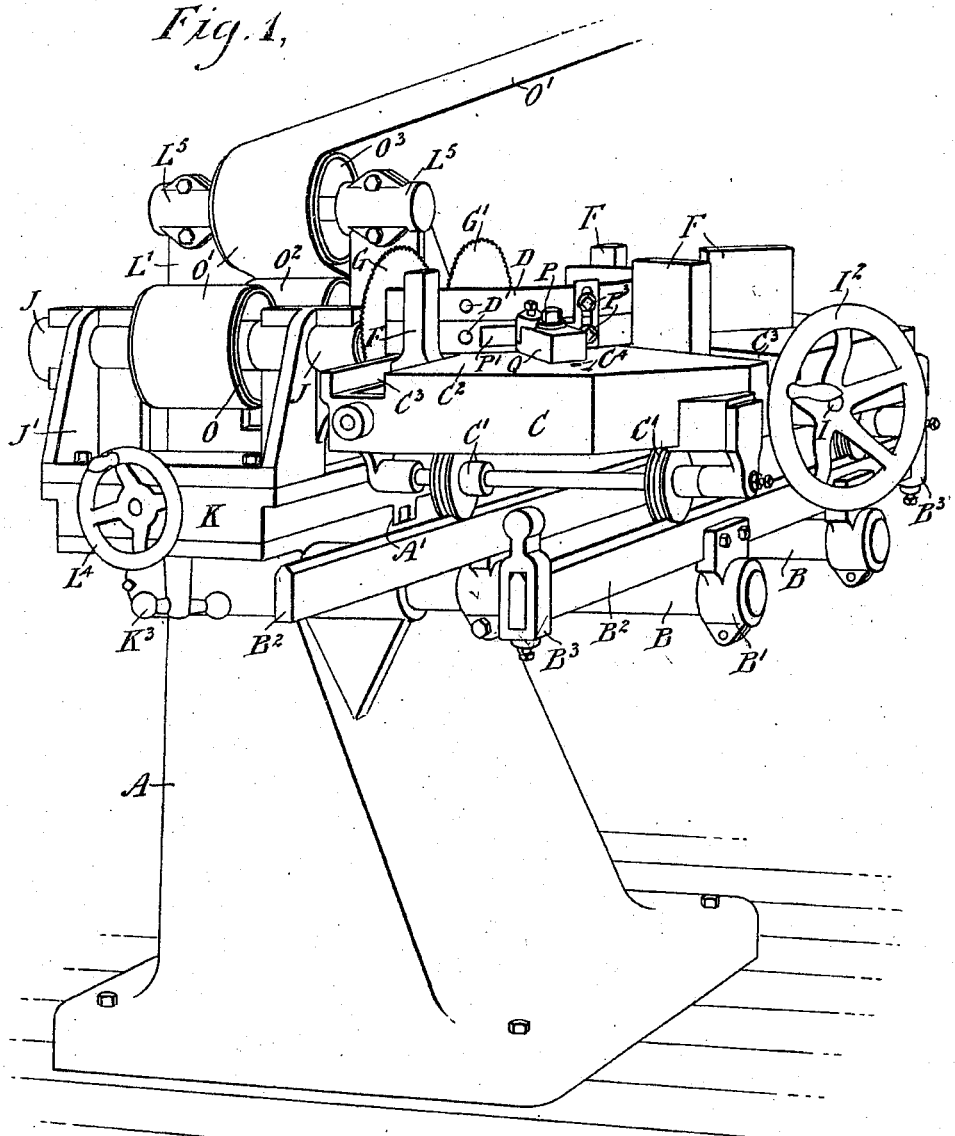
Figure 2:
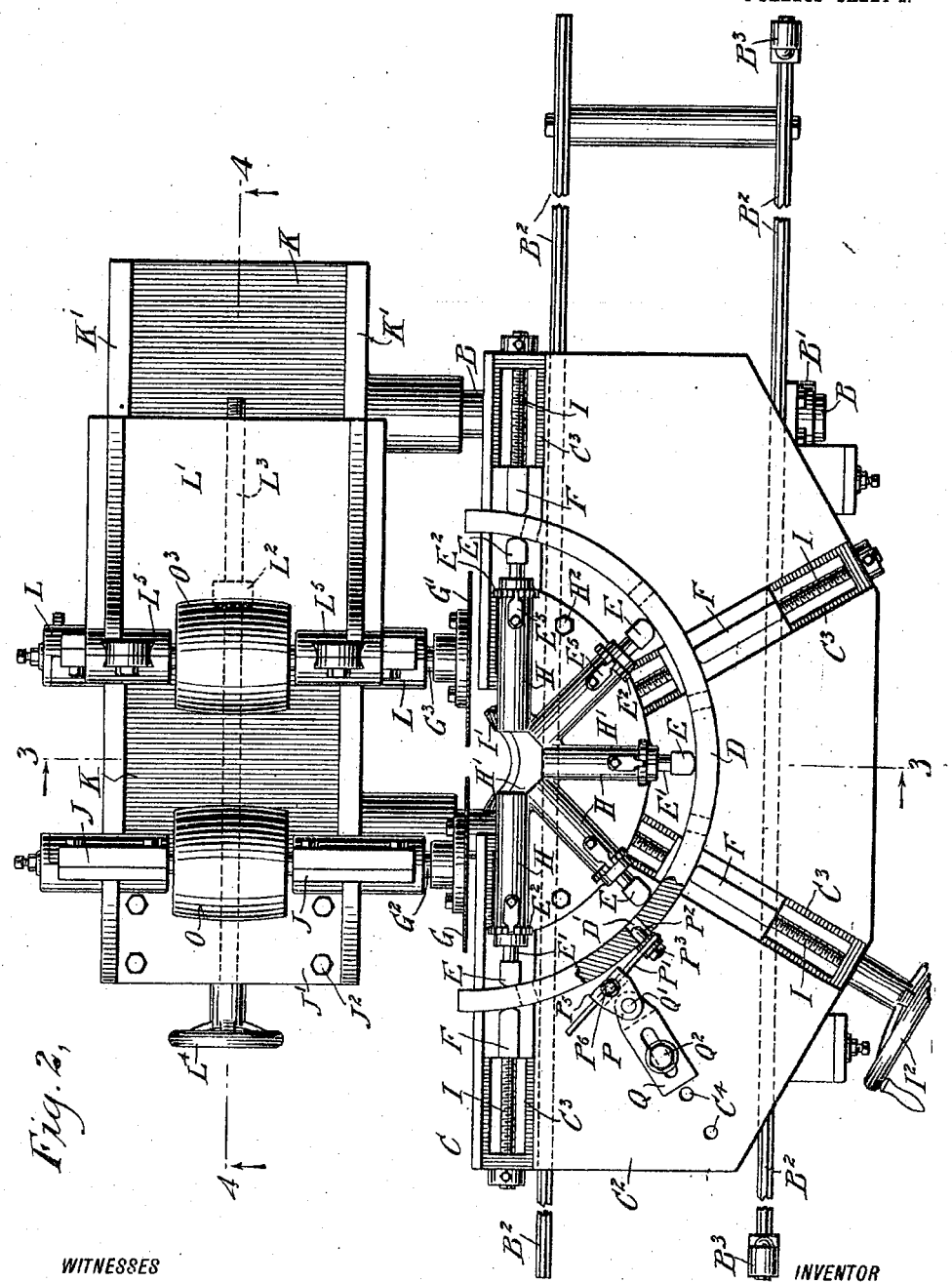

Figure 1 is a perspective view of the wheel rim equalizing and truing machine arranged to shape two superimposed half rims at the same time; Fig. 2 is a plan view of the same, part of the upper half rim being shown in section; Fig. 3 is an enlarged cross section of the same on the line 3—3 of Fig. 2; Fig. 4 is a sectional side elevation of part of the sawing mechanism, the section being on the line 4—4 of Fig. 2; Fig. 5 is a plan view of the centering device, the pressure blocks and the means for imparting movement thereto; Fig. 6 is an enlarged central side elevation of the centering device; and Fig. 7 is a face view of the pin arm of the centering device.

In the manufacture of wheels having two-part rims or fellies, each rim part after being bent and provided with spoke holes is usually not of a true semicircular shape, that is, the curvature is not circular and the ends are usually extended beyond a half circle and have to be cut off prior to placing the rim parts in position on the spokes. In the machine presently to be described in detail, one, two or more half rims or fellies are centered on the table of a carriage and are then subjected to pressure with a view to bend the half rims into true circular shape and to hold the half rims in the centered and trued position while cutting off the ends of the half rims in a diametrical line to produce a true semi-circular rim, the cutting off of the ends being from the inner face of the half rim in an outward direction so that a smooth cut is had on the inner face and the sides of the rim while any bur that may be on the peripheral face is of little or no consequence as the said peripheral face is subsequently covered by a metal tire.

The machine is mounted on a suitably-constructed frame A supporting transversely-extending bars B, B, provided with brackets B' supporting rails B² forming a track for the wheel C' of a carriage C to run on, either to the right or to the left, the movement in either direction being limited by stops B³ secured on the ends of one of the rails B². The carriage C is provided with a level top or a table C² on which is placed half rims D, or on top of this half rim may be placed another half rim to permit of treating both half rims simultaneously, with a view to give the same a true semicircular shape, as hereinafter more fully explained.

The inner faces of the two superimposed half rims D rest against abutments E arranged in a circle, and the outer or peripheral faces of the said superimposed half rims D are adapted to be engaged by pressure blocks F mounted to slide on suitable guideways C³ arranged on the carriage C, the said pressure blocks F serving to bend the half rims D on the abutments E to true circular shape and to hold the half rims in this position while cutting off the ends in a diametrical line by the use of two circular saws, G, G' disposed within the openings of the half rims so that on shifting the carriage C to the right the saw G cuts off the left-hand ends of the half rims D and on shifting the carriage C to the left the circular saw G' cuts off the right-hand ends of the superimposed half rims D, it being understood that the circular saws G and G' are disposed in a vertical plane passing diametrically through the half rims D. Each of the abutments E is adjustable to permit of setting the several abutments to a true circle, and for this purpose each abutment E is provided with a screw rod E' mounted to slide in a bearing H, and the bearings for the several abutments are mounted in a plate H' fastened by bolts H² to the carriage C so as to move with the same, the several bearings H being arranged radially, as plainly indicated in Fig. 2. A nut E² is held in a recess in each bearing H and screws on the screw rod E' so that when the nut E² is turned a sliding movement is given to the screw rod E' to move the corresponding abutment E outward or inward according to the direction in which the nut E² is turned. The screw rod E' is provided with a longitudinally-extending key-way E³ engaged by a key E⁴ held in the corresponding bearing H, and over the said key E⁴ extends a plate E⁵ fastened at one end by a bolt E⁶ to the top of the bearing H and engaging with its other end one of a series of notches E⁷ formed in the peripheral face of the nut E² to normally hold the nut locked against turning. It is understood that when the abutment E is to be adjusted the arm E⁵ is removed to permit of turning the nut E² for adjusting the abutment inward or outward, as before explained, and when the desired adjustment is reached the arm E⁵ is replaced to lock the nut against turning and also to hold the key E⁴ against accidental disengagement from the bearing H and the key-way E³.

The pressure blocks F are moved simultaneously inward or outward, and for this purpose the following arrangement is made: Each pressure block F is provided at its bottom with an integral nut F' (see Fig. 3) in which screws a screw rod I mounted to turn in suitable bearings on the carriage C, and on the inner end of each screw rod I is secured a bevel gear wheel I', and the several bevel gear wheels I' are in mesh one with the other, as plainly indicated in Fig. 5, so that when one of the screw rods I is turned the several screw rods I turn in unison and in doing so move the pressure blocks F inward or outward simultaneously and according to the direction in which the screw rods I are turned. One of the screw rods I is provided at its outer end with a hand wheel I² under the control of the operator for turning the screw rod so as to move the blocks simultaneously inward or outward.

The circular saws G and G' are mounted on spindles or arbors G², G³, of which the spindle G² is journaled in suitable bearings J provided with a bracket J' fastened by bolts J² to one end of a slide K mounted to slide transversely on a guideway A' arranged on top of the frame A. The spindle G³ is mounted to turn in bearings L attached to a bracket L' mounted to slide longitudinally on guideways K' forming part of the slide K. The bracket L' is provided on its under side with a fixed nut L² in which screws a screw rod L³ extending longitudinally and mounted to turn in the left-hand end of the slide K (see Fig. 4), and the outer end of the screw rod L³ is provided with a hand wheel L⁴ under the control of the operator to permit the latter to turn the screw rod L³ with a view to move the bracket L' in a longitudinal direction and with it the circular saw G' to move the latter nearer to or farther from the circular saw G according to the larger or smaller diameters of the half rims D in the machine at the time.

In order to move the circular saws G, G' forward or backward in order to locate the circular saw in a vertical plane passing through the center of the half rims D under treatment the following arrangement is made, special reference being had to Fig. 3: A transverse screw rod N is mounted to turn in a bearing K² forming part of the slide K and the said screw rod N screws in a nut N' attached to the frame A, and on the rear end of the screw rod N is secured a hand wheel N² adapted to be turned by the operator to turn the screw rod N with a view to screw the same forward or backward in the nut N' and thus impart a transverse sliding motion to the slide K and the brackets J' and L' supporting the spindles G², G³ of the saws G and G'. When the desired adjustment has been made set screws K³ screwing in the main frame A are screwed up against the under side of the slide K to lock the latter in the adjusted position on the top of the main frame A. The saw spindle G² is provided intermediate the bearings J with a pulley O around which passes a belt O' connected with suitable machinery for imparting a traveling motion to the said belt O', and the latter also passes around a pulley O² secured on the saw spindle G³, and the belt O' also passes around a guide pulley O³ on a shaft O⁴ journaled in bearings L⁵ on the upper portion of the bracket L'. By the arrangement described a simultaneous rotary motion is given to both circular saws G, G' when the machine is running and a traveling motion is given to the belt O'.

In order to enable the operator to quickly and accurately center the half rims D on the table C² of the carriage C, use is made of a centering device P, shown in Figs. 1, 2, 5, 6 and 7. The centering device P consists essentially of an arm P' carrying one or more pins P² according to the number of half rims placed on the table C² at the time, each pin P² being adapted to engage one of the spoke holes D' of the corresponding half rim D (see Fig. 2). Each pin P² is provided with a bolt P³ vertically adjustable in a vertical slot P⁴ on the arm P' to permit of raising or lowering the pins P² according to the width of the half rims D placed on the table C² at the time. The arm P' slidably engages a bearing P⁵ and the arm is locked in place on the bearing by a set screw P⁶, and the bearing P⁵ is mounted to swing on a vertical pivot Q' held on a bracket Q resting on the table C² and adjustably fastened in place thereon by a bolt Q² extending through an elongated slot Q³ formed in the bracket Q, the bolt screwing in one of a series of apertures C⁴ formed in the top of the table C² and arranged in a radial line, the center of which coincides with the center of the half rims D. On loosening the bolt Q² the bracket Q can be adjusted to permit of setting the bearing P⁵ and the arm P' so as to engage the corresponding pin P² with a spoke hole D' to hold the rim D in centered position, prior to moving the pressure blocks F inward to bend the half rim to accurate circular shape. When the desired adjustment is made the bolt Q² is screwed up to fasten the bracket Q in place. By mounting the arm P' in a swinging bearing P⁵ the arm can be swung toward or from the peripheral face of the half rim D to engage the pin P² with a spoke hole or disengage the same therefrom for removal of the half rim from the machine or for replacing another half rim on the machine. By mounting the bracket Q adjustably on the table C² the centering device can be located in such a manner as to engage rims of larger or smaller diameters.

The operation is as follows: In using the machine, the pressure blocks F are moved outward to allow of conveniently placing a half rim D or two or more superimposed half rims on the table C² so that the inner faces of the half rims abut against the abutments E, and the half rims are turned around until the pins P² can engage the corresponding spoke holes D' to hold the half rims in centered position on the table C². The operator now turns the hand wheel I² so as to move the pressure blocks F inward to bend the half rims to true circular form on the abutments E. The operator now shifts the carriage C to the left so that the circular saw G' cuts off the right-hand ends from the half rims D and then the carriage C is shifted to the right so that the circular saw G cuts off the left-hand ends of the half rims D, and as the circular saws G and G' are arranged in a vertical plane diametrically of the half rims D it is evident that the latter are reduced to true semicircular shape. The movement of the carriage C to the right is continued until the half rims D are clear of the saws, and then the operator disengages the pins P² from the half rims D and turns the hand wheel I² in the reverse direction so as to move the pressure blocks F outwardly out of engagement with the half rims D. The latter are now removed from the table C² and then another half rim or two or more superimposed half rims are placed on the table C² and the carriage is returned to former position, after which the half rims are centered on the abutments E and the pressure blocks F are moved inward to bend the half rims to circular shape, and then the carriage is shifted first to the left and then to the right for the saws G' and G to cut off the ends of the said half rims as before explained.

From the foregoing it will be seen that by the arrangement described a bending or truing means is provided for bending half rims so that the latter assume a true circular form, and then the equalizing means are employed for cutting off the ends of the half rims to produce a half rim of true circular shape, thus eliminating subsequent sawing of the joints when placing the half rims on the spokes of the wheel.

Having thus described my invention, I claim as new and desire to secure by Letters Patent:

1. A wheel rim equalizing and truing machine, comprising a pair of circular saws arranged in the same plane, a carriage mounted to travel sidewise in front of the said saws, truing means mounted on the said carriage for bending a wheel rim to a true circle and holding it in this trued position while moving the said carriage sidewise to cut off the ends of the rim by the said saws, the latter being located diametrically within the opening of the rim to cut off the ends from the inside of the rim to the outside thereof.

2. A wheel rim equalizing and truing machine, comprising a carriage mounted to travel, a centering device on the carriage for centering the wheel rim, truing means mounted on the carriage for bending the wheel rim to a true circle, and sawing means intermediate the ends of the wheel rim for cutting off the ends while the wheel rim is held in centered and trued position.

3. A wheel rim equalizing and truing machine, comprising a traveling carriage, abutments arranged in a circle for the inner face of a wheel rim to abut against, pressure devices movable on the carriage and adapted to engage the peripheral face of the wheel rim to bend the latter and cause it to assume a circular form, a pair of saws arranged intermediate the ends of the wheel rim and located in a plane diametrically relative to the wheel rim to reduce the wheel rim to true semicircular form, head stocks carrying the said saws, one of the head stocks being adjustable toward and from the other head stock, a support carrying the said head stock, and manually-controlled means for adjusting the support transversely.

4. A wheel rim equalizing and truing machine, comprising a traveling carriage, abutments arranged in a circle for the inner face of a wheel rim to abut against, pressure devices movable on the carriage and adapted to engage the peripheral face of the wheel rim to bend the latter and cause it to assume a circular form, a pair of saws arranged intermediate the ends of the wheel rim and located in a plane diametrically relative to the wheel rim to reduce the wheel rim to true semicircular form, head stocks carrying the said saws, a slide having longitudinal guideways on which one of the said head stocks is longitudinally adjustable and the other head stock is fixed, and a support on which the said slide is mounted to slide transversely.

5. A wheel rim equalizing and truing machine, comprising a pair of circular saws arranged in the same plane, a carriage mounted to travel sidewise in front of the said saws, truing means mounted on the said carriage for bending a wheel rim to true circular shape and holding it in this trued position while moving the said carriage sidewise to cut off the ends of the rim by the said saws, the latter being located diametrically within the opening of the rim to cut off the ends from the inside of the rim to the outside thereof, manually-controlled means for adjusting one saw toward or from the other, and manually-controlled means for adjusting the saws toward or from the said truing means.

6. A wheel rim equalizing and truing machine, comprising a carriage having a table for a wheel rim to rest on, abutments arranged in a circle and adapted to engage the inner face of the wheel rim, bearings on the said table carrying the said abutments, means for adjusting the said abutments in the said bearings, presser blocks mounted to slide on the said table and adapted to engage the outer face of the wheel rim and manually-controlled means mounted on the said table and connected with the pressure blocks to move the same in unison, a centering device mounted on the said table and having an adjustable arm provided with a pin adapted to engage one of the spoke holes of the wheel rim, and sawing means for sawing off the ends of the wheel rim to reduce the latter to true semicircular form.

In testimony whereof I have signed my name to this specification in the presence of two subscribing witnesses.

GEORGE A. ENSIGN.

Witnesses:
R. CAREY MAY,
C. C. HOFFMAN.

Copies of this patent may be obtained for five cents each, by addressing the "Commissioner of Patents Washington, D. C."